Nov. 15, 1932.   C. N. KOCH   1,887,717
COMBUSTION TURBINE
Filed Sept. 1, 1923   12 Sheets-Sheet 1
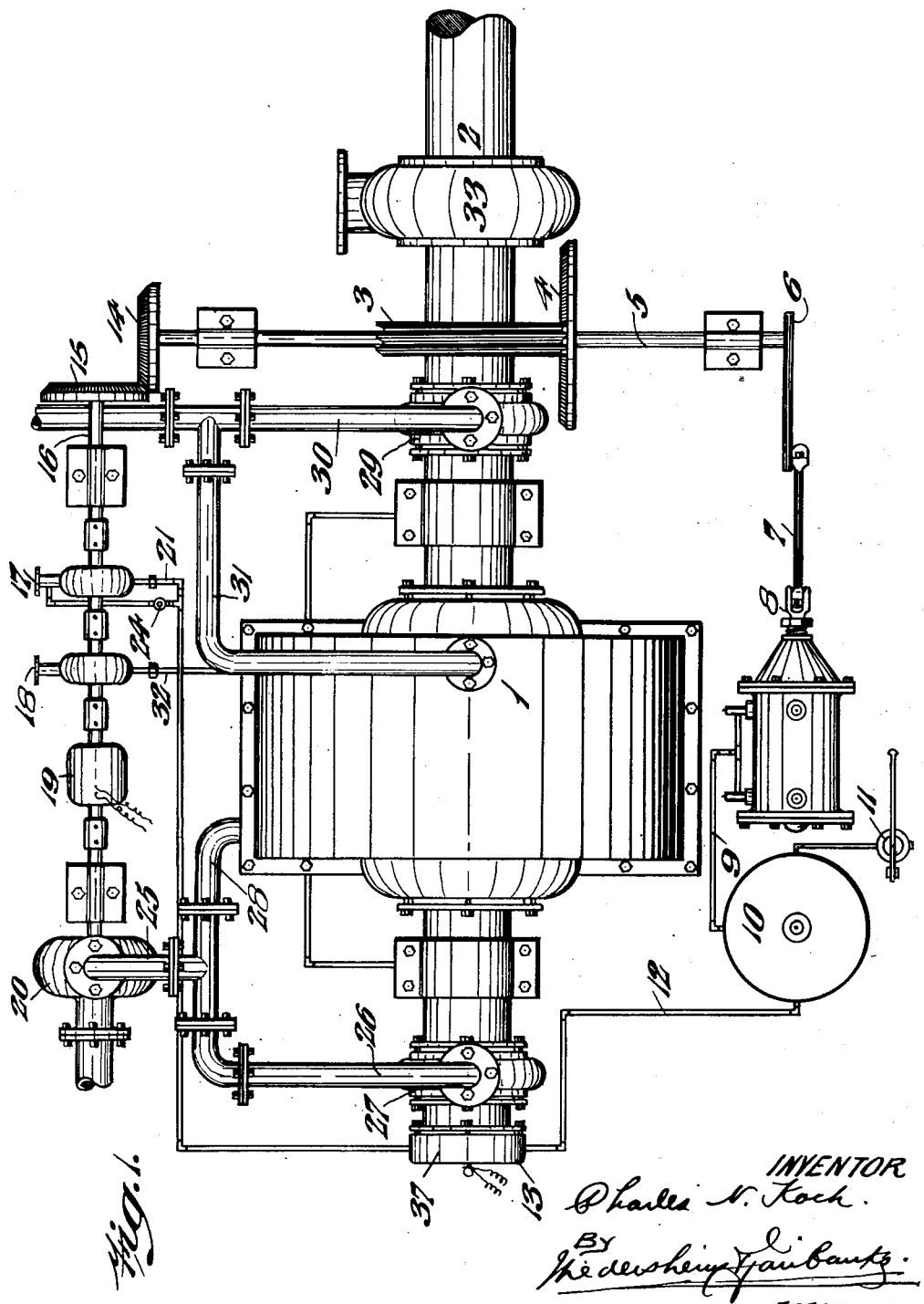

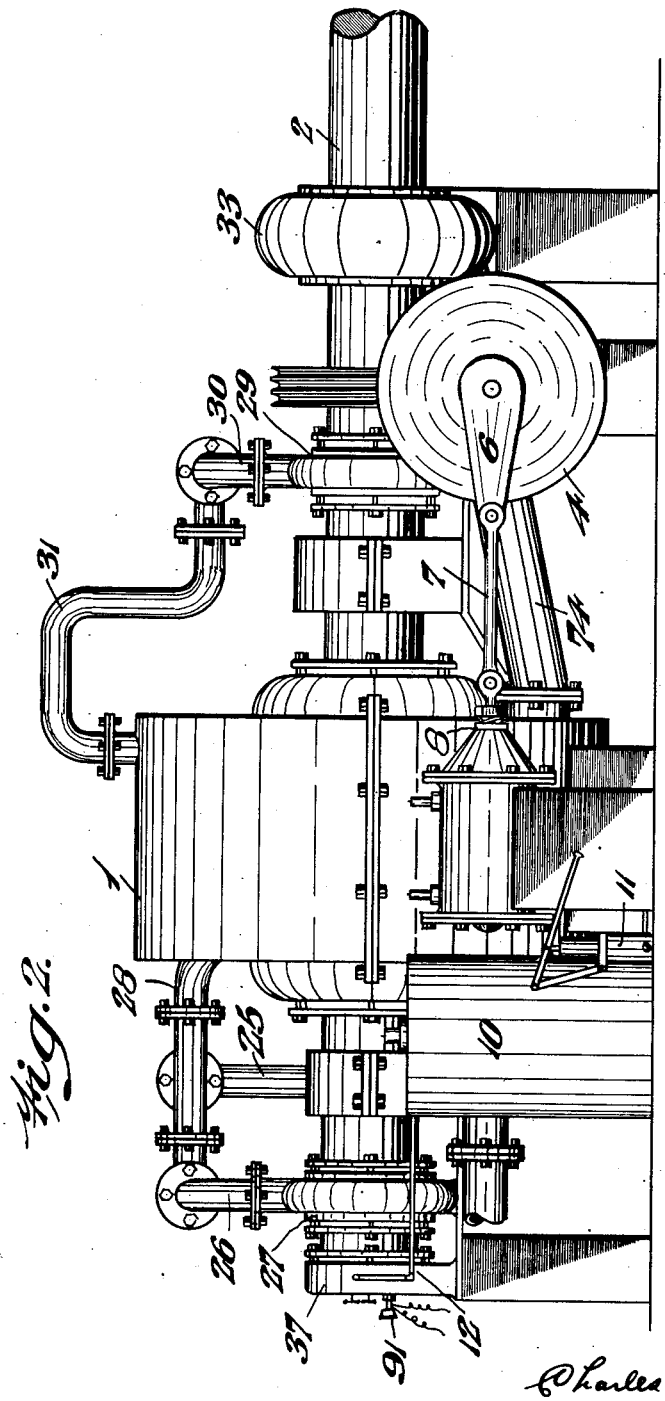

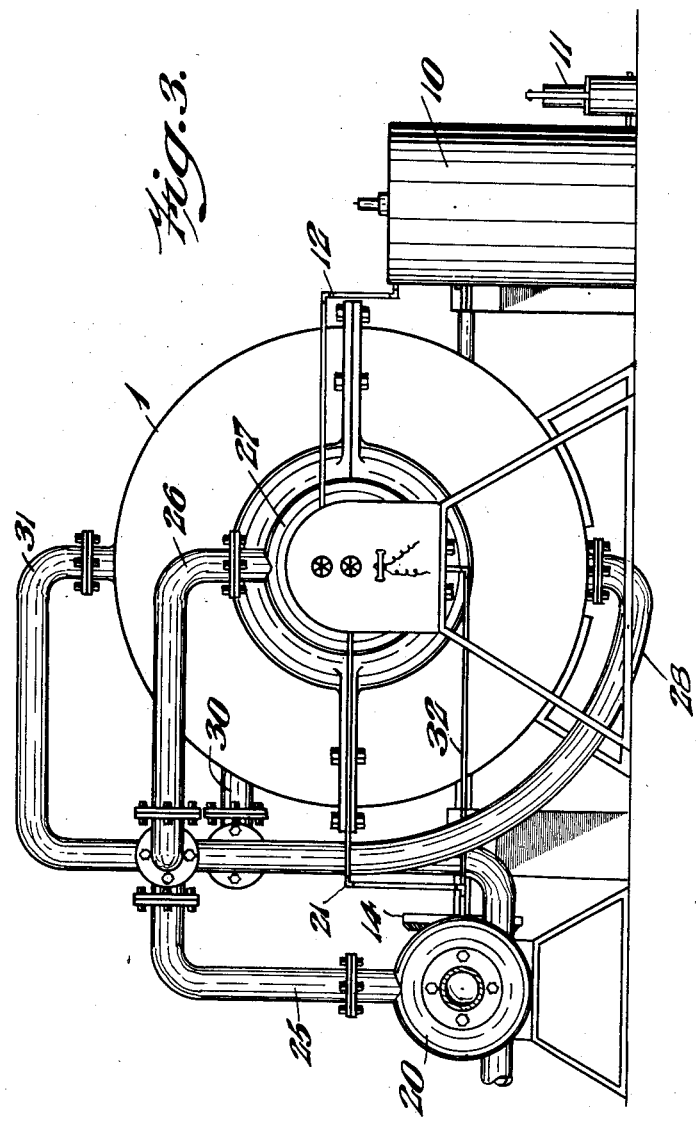

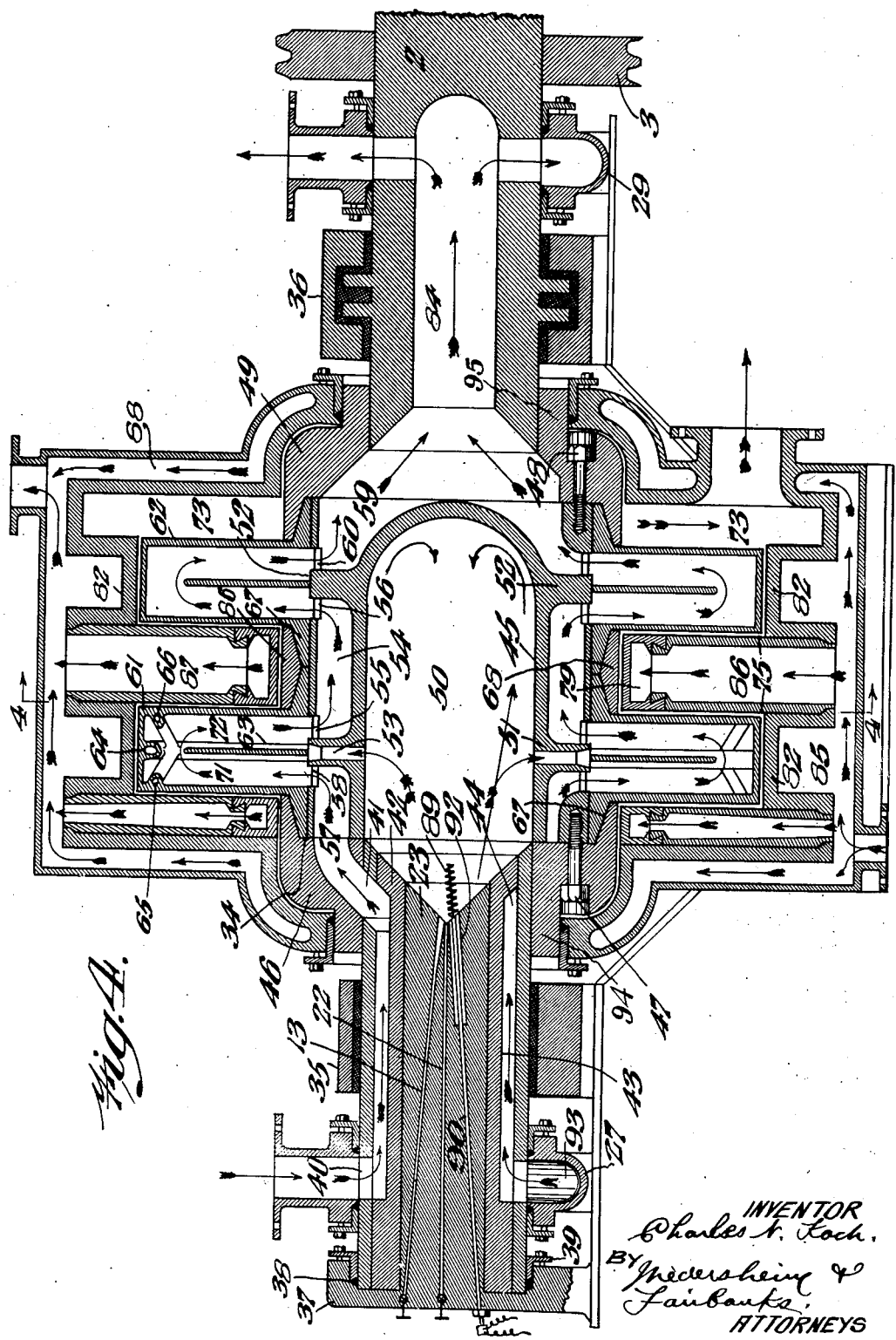

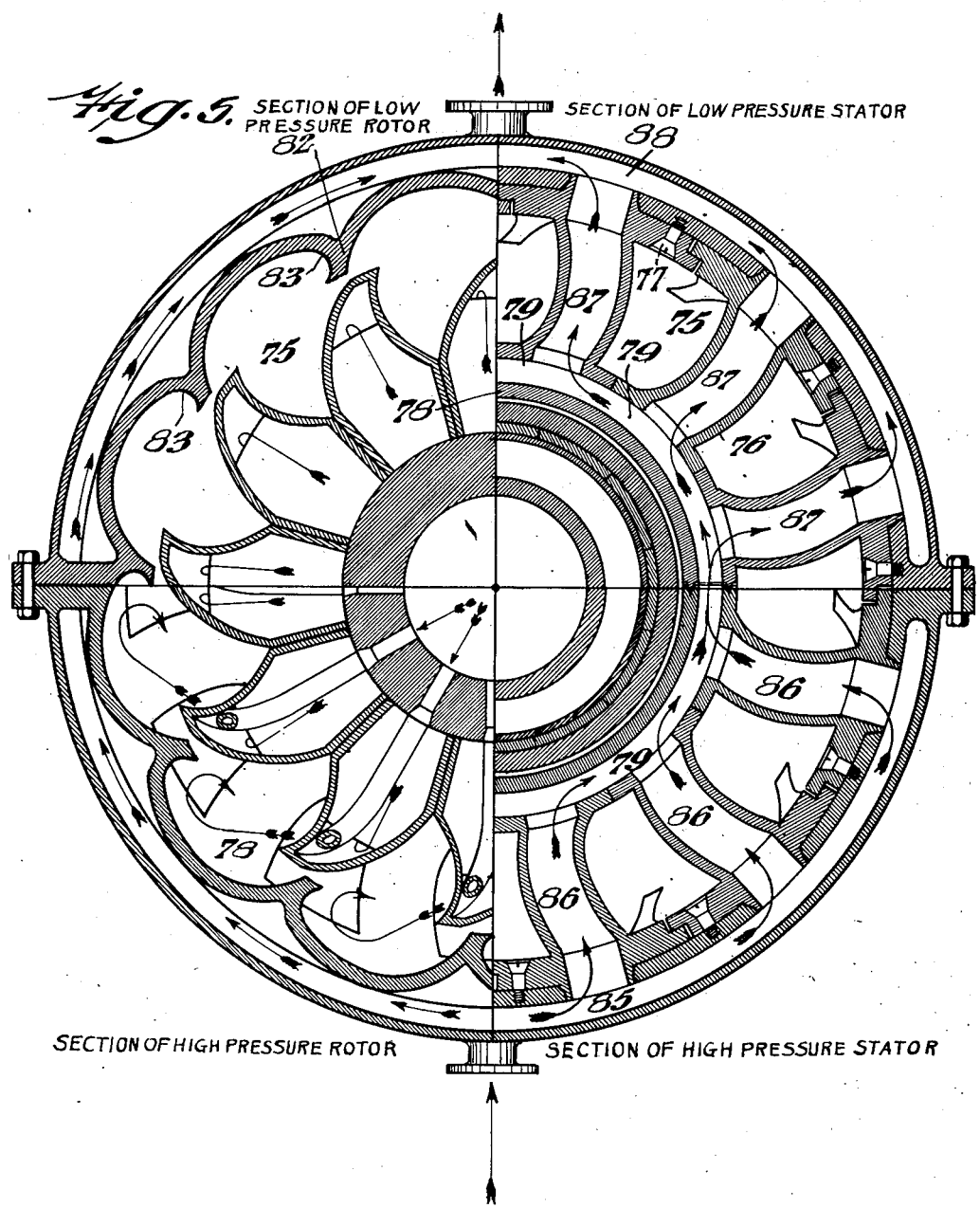

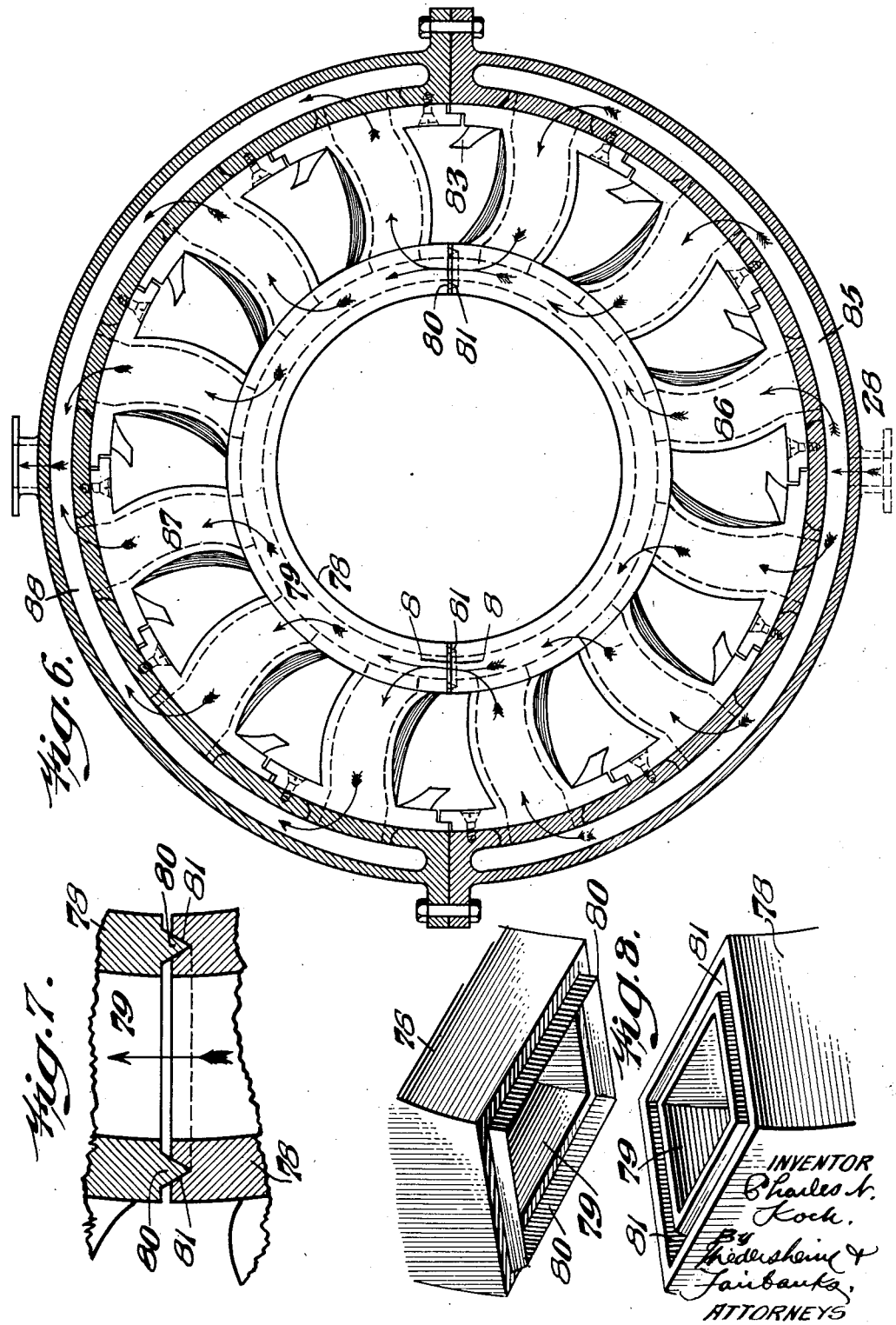

Nov. 15, 1932.  C. N. KOCH  1,887,717
COMBUSTION TURBINE
Filed Sept. 1, 1923  12 Sheets-Sheet 7

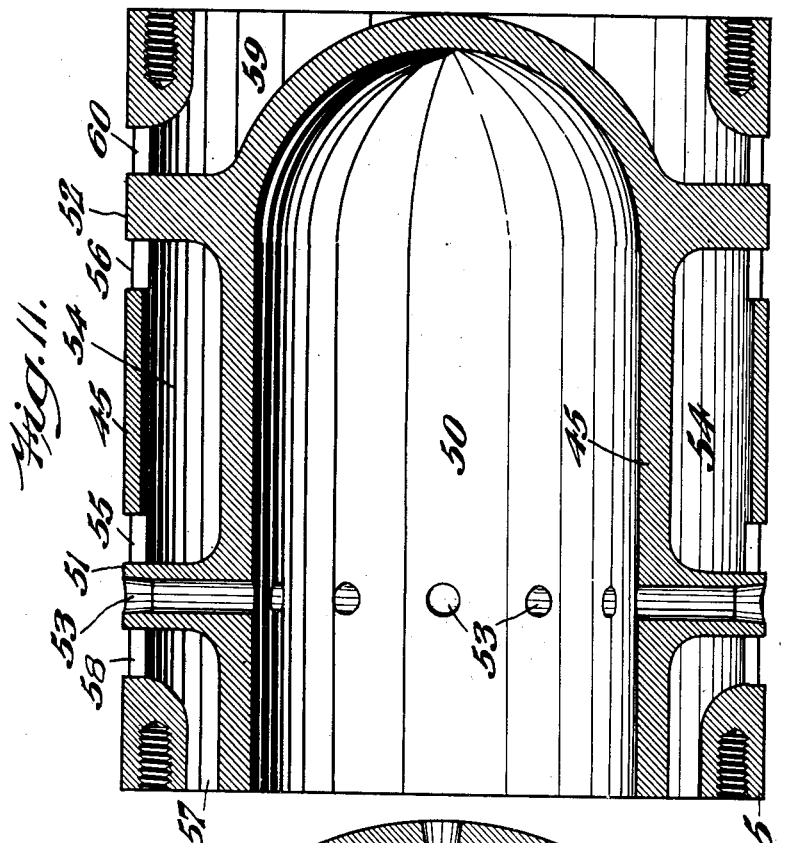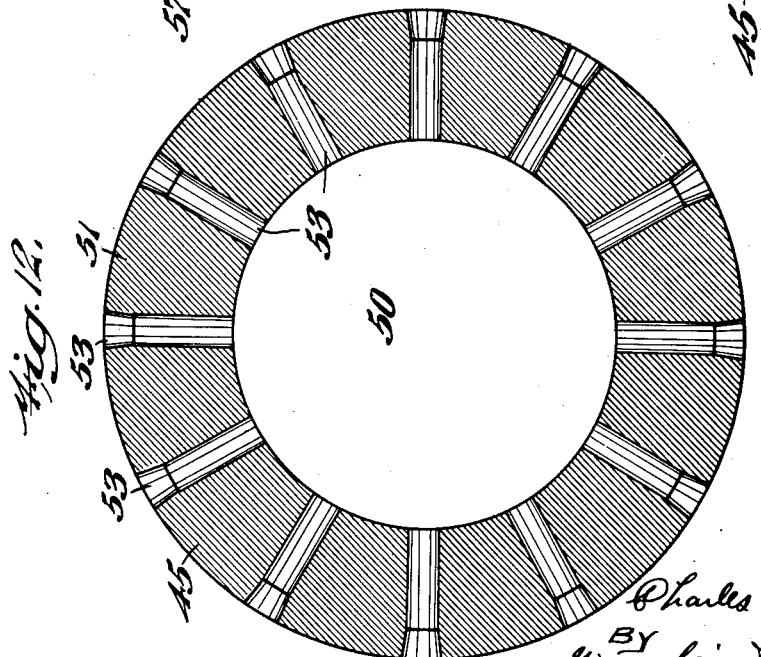

Nov. 15, 1932.    C. N. KOCH    1,887,717
COMBUSTION TURBINE
Filed Sept. 1, 1923    12 Sheets-Sheet 9
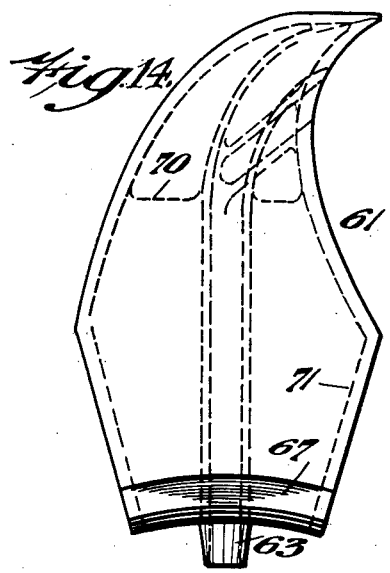
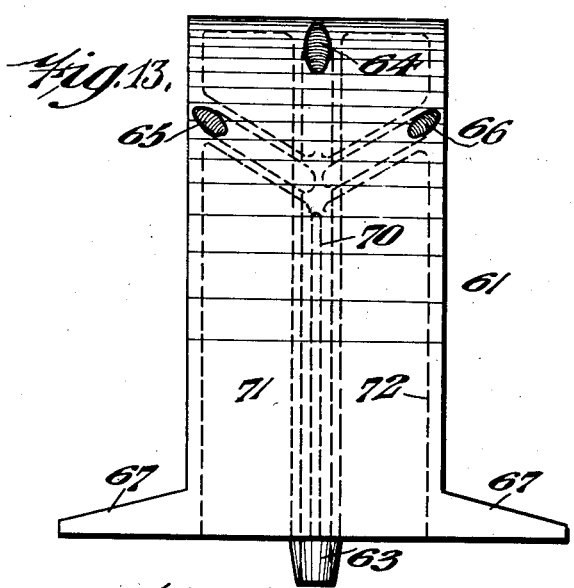
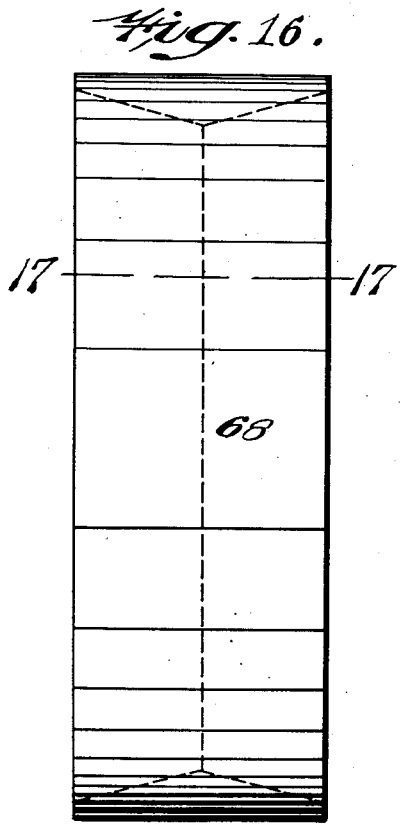
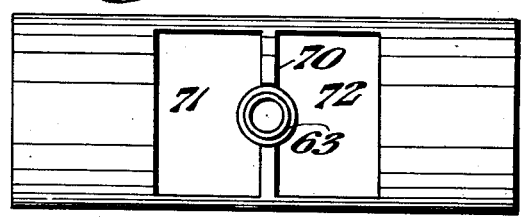
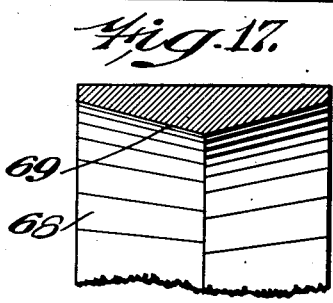

Nov. 15, 1932.                C. N. KOCH                 1,887,717
                           COMBUSTION TURBINE
                      Filed Sept. 1, 1923      12 Sheets-Sheet 10
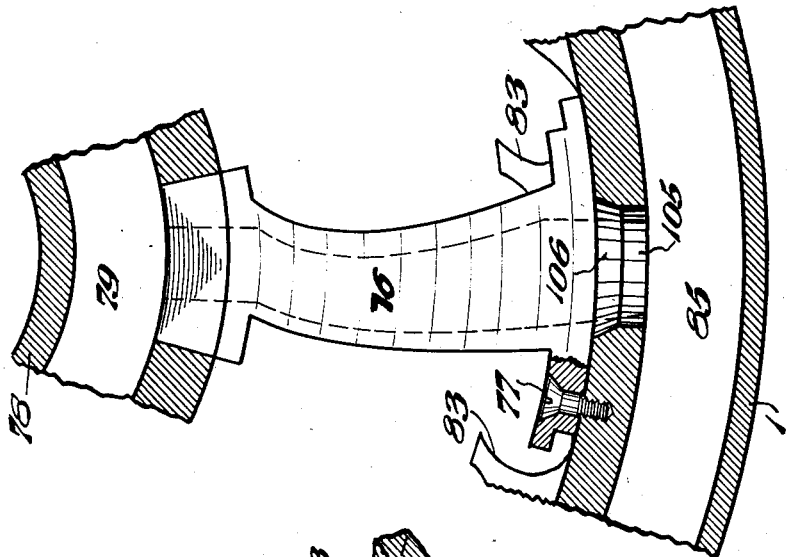
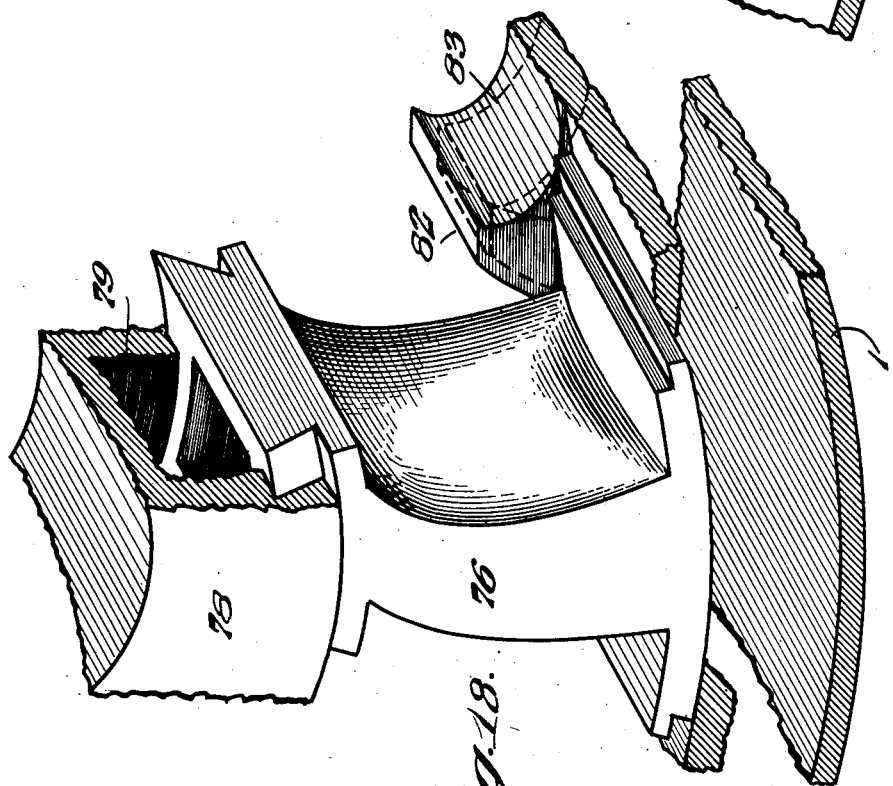

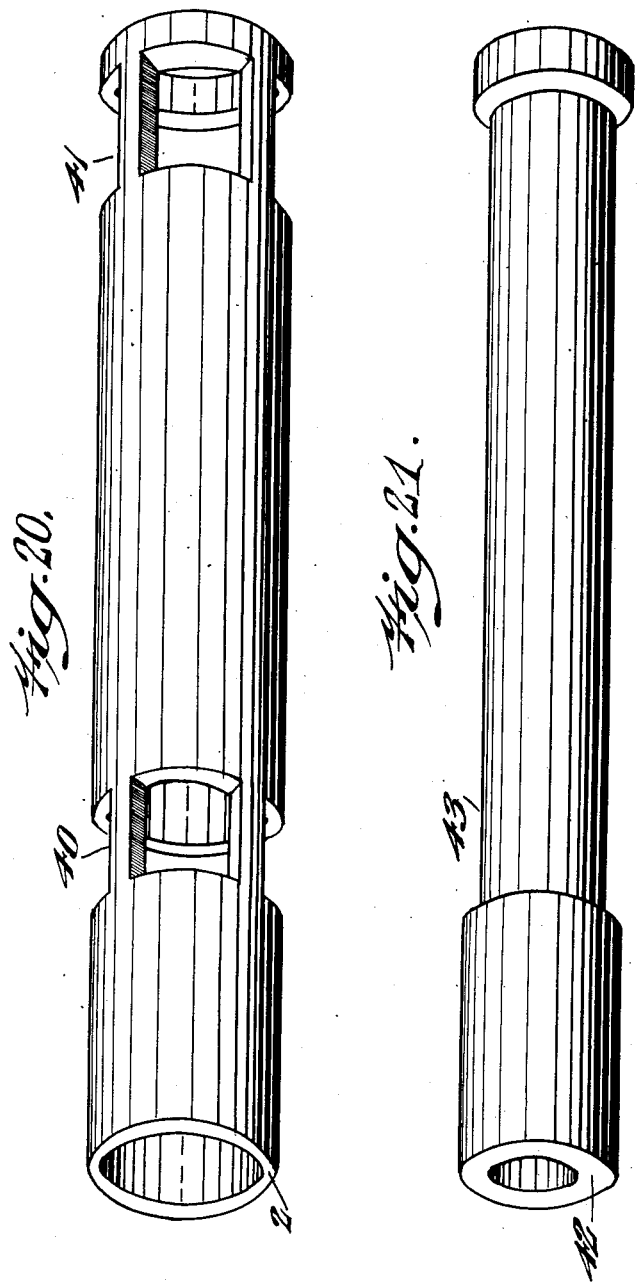

Nov. 15, 1932.   C. N. KOCH   1,887,717
COMBUSTION TURBINE
Filed Sept. 1, 1923   12 Sheets-Sheet 12
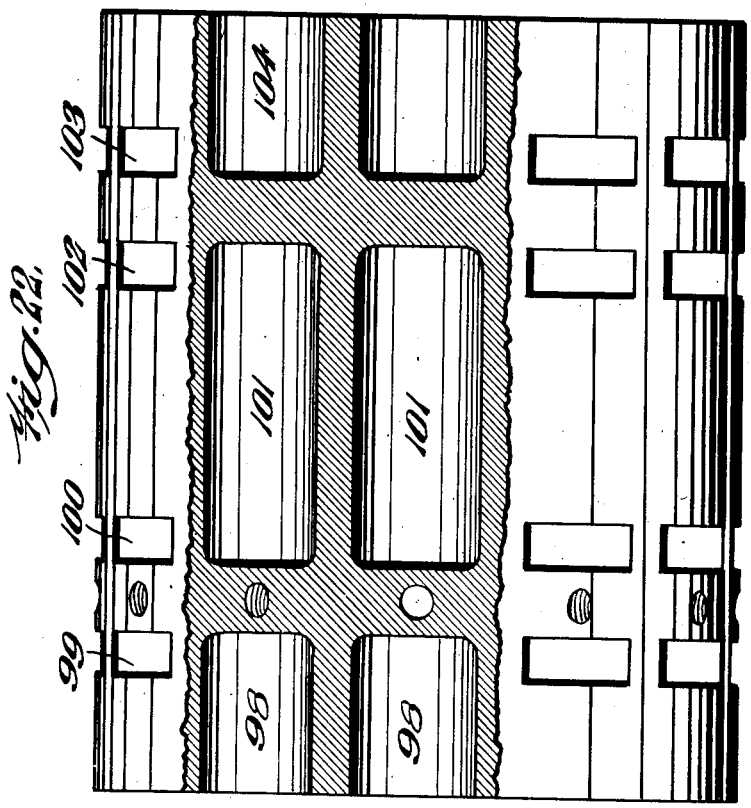

Patented Nov. 15, 1932

1,887,717

UNITED STATES PATENT OFFICE

CHARLES N. KOCH, OF KANE, PENNSYLVANIA

COMBUSTION TURBINE

Application filed September 1, 1923. Serial No. 660,470.

(GRANTED UNDER THE ACT OF MARCH 3, 1883, AS AMENDED APRIL 30, 1928; 370 O. G. 757)

My present invention comprehends a novel combustion turbine.

One of the main objects of this invention is to devise a combustion turbine in which are provided simple and satisfactory means for cooling all of the parts subjected to high temperatures and especially the rotor and its component parts in direct or indirect contact with the highly heated gases and thus provide the proper and positive introduction and circulation of the cooling medium under all working speeds and conditions without bringing the cooling medium into contact with the heated gases or their component parts.

It further comprehends novel means for introducing the fuel, which may be solid, liquid, or ignitable gas, and for introducing air, in such manner as to secure the desired ignition, more intimate fuel distribution, and utilization of the gases to produce the greatest constant rotative effect at any desired speed of the rotor and to accomplish such result with minimum consumption of fuel and with maximum economy.

It further comprehends a novel engine of simplified design and construction which can be economically manufactured with a minimum of weight per horsepower, and wherein the parts are readily accessible for the purpose of inspection, repair, or renewal.

For the purpose of illustrating my invention, I have shown in the accompanying drawings forms thereof which are at present preferred by me, since they will give in practice satisfactory and reliable results, although it is to be understood that the various instrumentalities which my invention comprehends can be variously arranged and organized and that my invention is not limited to the precise arrangement and organization of these instrumentalities as herein shown and described.

Figure 1 represents a top plan view of a combustion turbine, embodying my invention.

Figure 2 represents the turbine in side elevation.

Figure 3 represents a front elevation.

Figure 4 represents an irregular longitudinal section of the assembled turbine.

Figure 5 represents an irregular transverse section of the turbine, showing four different sectional views.

Figure 6 represents a section on line 4—4 Figure 4.

Figure 7 represents an enlarged central vertical section of the adjacent portions designated 80, 81 in Figure 6.

Figure 8 represents in perspective the joint construction seen in Figure 7.

Figure 11 represents a section on line 11—11 of Figure 9.

Figure 12 represents a section on line 12—12 of Figure 9.

Figure 13 represents in front elevation a high pressure rotor blade in detached position.

Figure 14 represents a side view of the rotor blade seen in Figure 13.

Figure 15 represents a bottom plan view of the rotor blade seen in Figure 13.

Figure 16 represents in side elevation the rotor blade securing ring.

Figure 17 represents a section on line 17—17 of Figure 16.

Figure 18 represents in perspective a stator blade, annular blade and a portion of the shrouding.

Figure 19 represents in side elevation the construction seen in Figure 18.

Figure 20 represents in perspective the forward section of the rotor shaft.

Figure 21 represents in perspective the rotor shaft sleeve.

Figure 22 represents in side elevation and partly broken away a modified form of rotor drum.

Similar numerals of reference indicate corresponding parts.

Referring to the drawings:—

Figure 9:
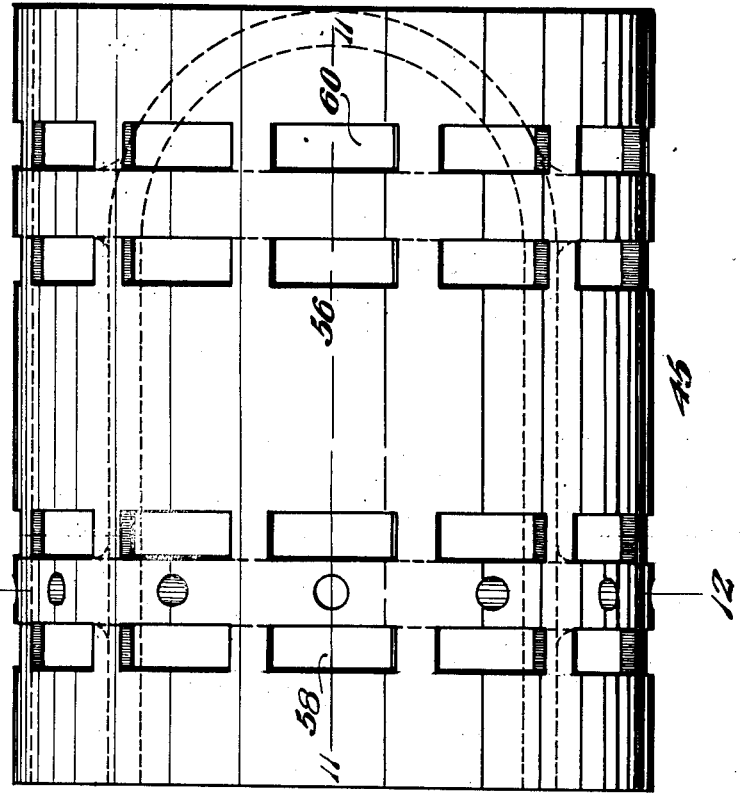
Figure 9 represents, in side elevation, the rotor drum.
Figure 10:
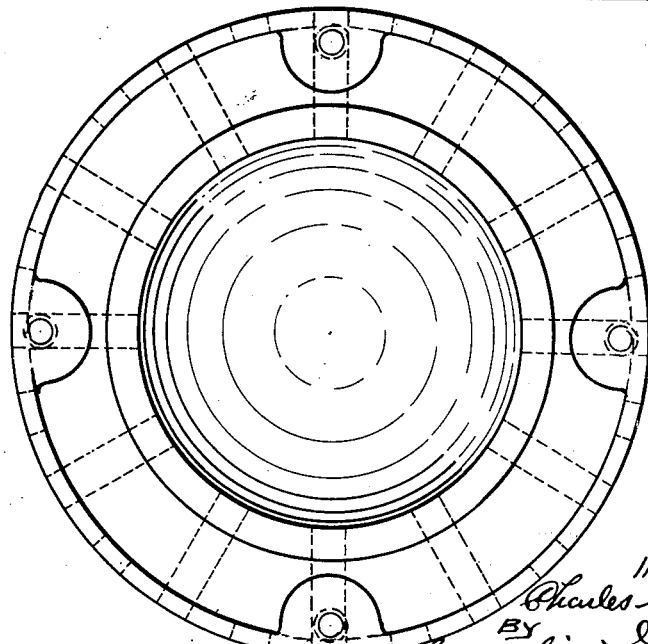
Figure 10 represents an elevation of the rotor drum shown in Figure 9.

The general arrangement of the turbine will be best understood from Figure 1, in which 1 designates the turbine casing, and 2 the rotor shaft which is made in sections for convenience of manufacture. The rotor shaft 2 has a worm-gear 3 which drives a gear 4 fixed to a jack shaft 5. The shaft 5 is connected by the crank arm 6 to the connecting rod 7 which in turn is connected to the piston of an air compressor 8 which discharges through a conduit 9 to an air accumulator 10. The air accumulator can also be charged by a hand pump 11. 12 designates a conduit leading from the accumulator 10 to the valve controlled air nozzle passage 13. The jack shaft 5 has a gear 14 which drives a gear 15 on an auxiliary shaft 16 which latter drives the fuel pump 17, the lubricating pump 18, the generator 19 and the pump 20 for the cooling medium. A fuel line 21 leads from the fuel pump 17 to the valve controlled fuel nozzle passage 13 in the nozzle member 23, said passage 13 having a progressively flaring outlet passage whose greatest area is at its outlet in the inner end of stationary nozzle member 23. Said flaring outlet compensates for the expansion in volume of the air due to getting hotter as it approaches its entrance to the chamber 50. Furthermore, said flaring outlet facilitates the starting of the turbine, at which time relatively small volumes of air and fuel are required with the air entering the combustion chamber at less than normal velocity due to a minimum adjustment of the air admission valve wheel, which is the upper one shown in the center of Figure 3, as well as to the slowing up of the normal air velocity by the flaring air outlet 13, which is at starting normally cold. As the turbine warms up the air and fuel admission valve wheels shown in the center of Figure 3 are opened by progressive stages until the maximum load is upon the turbine and it is running at normal speed.

The inlet and discharge of the fuel pump is connected by a valve controlled bypass 24. The cooling medium passes from its pump 20 through conduit 25, one branch 26 of which leads to the admission receptacle 27 and the other branch 28 of which leads to the bottom half of the turbine casing. 29 designates the rotor shaft discharge receptacle which leads by conduit 30 to the source of supply of the cooling medium. 31 designates a pipe for discharging the cooling medium from the turbine casing to the conduit 30. The lubricating pump 18 passes the lubricant by pipe 32 to the bearings and various parts to be lubricated. 33 designates the exhaust pump for carrying away the spent gases.

*The rotor and its adjuncts*

34 designates the rotor, the forward section of its shaft 2 being journalled in a bearing 35 and its rear section being journalled in a journal and thrust bearing 36. The nozzle 23 is connected with a head or standard 37 which is recessed as at 38 to receive the forward end of the juxtaposed section of the rotor shaft and a stuffing box 39 is provided, see Figure 4. The rotor shaft 2 has its forward section, see Figure 20, hollow and provided with inlet ports 40 and outlet ports 41. 42 designates a rotor sleeve having an annular groove 43 which forms a chamber 44. This sleeve forms at its ends fluid tight joints with the rotor shaft 2. 45 designates the rotor drum which is of special construction. The forward section of the rotor shaft has a tight fit in the rotor clamping head 46, which latter is connected by fastening devices 47 with the rotor drum, see Figure 4. The rotor drum 45 has connected with it by means of fastening devices 48 the rear clamping head 49, and the juxtaposed rotor shaft section 2 has a tight fit in said head 49. The rotor drum 45 is recessed to form a combustion chamber 50 and is provided with ribs 51 and 52, the rib 51 having ports 53 communicating with the combustion chamber 50. The drum 45 is cored out to form an annular passage 54 surrounding a portion of the combustion chamber. Ports 55 and 56 communicate with the passage 54. 57 designates an annular inlet channel opening by ports 58 through the periphery of the drum. 59 designates an annular outlet channel which opens by ports 60 through the periphery of the drum 45.

The rotor blading is best seen in Figures 4, 13, 14 and 15 and consists of high pressure or first stage rotor blades 61 and low pressure or second stage rotor blades 62. The only substantial difference between the high and the low pressure blades is that the high pressure blades are provided with gas tubes 63 which at their inner ends seat in the port 53 and are tapered to provide for an accurate fit. These tubes 63 open through the working face of the rotor blades and I have preferred to show them as having a discharge at 64 near the tip of the blades and at 65 and 66 near the sides of the blade. The base of a rotor blade has tapering side flanges 67 with which cooperate a clamping ring 46 and 49 at each end, which is reversely inclined as at 69 on its inner face. The outer sides of rotor blades are held in position by the clamping heads 34 and 49, see Figure 4. Any desired number of high and low pressure rotor wheels may be employed. Each rotor blade of each rotor wheel has a dividing diaphragm 70 forming chambers 71 and 72 communicating with each other at the outer portion of a blade. The spent gases accumulate in the chamber 73 which communicates by conduit 74, see Figure 2, with the exhaust pump 33. 75 designates the working space of the turbine, see Figure 5.

The stator blades 76 are secured to the turbine casing by fastening devices 77, see Figures 5, 18 and 19, and at their inner ends are connected to the annular shrouding 78 having a passage 79. This shrouding 78 is made in two parts one part having a rectangular rib 80 which seats in a recess 81 in the other part, see Figures 8 and 9. 82 designates an annular row of narrow supplemental stator blading extending beyond the periphery of each rotor wheel and having curved buckets 83 which cause the gases to react on the rotor blading, see Figure 5. The gases come at high velocity out of each outlet opening 64 and against the curved surfaces of the buckets 83, thence said gas flows along said curved surfaces to the adjacent curved side of the supplemental stator blades 82 which deflect said gases back against the surface of succeeding stator blades 61. The force of the discharge of the gases from said openings 64 causes a reaction at the tip of each of said blades 61, substantially tending to turn the rotor wheel formed of said blades 61 toward the left from the upper part of Figure 5. The force of the said deflection of the streams of gas from openings 64 to the supplemental stator blades 82 and thence against the working faces of the succeeding rotor blades 61 also exerts substantial force tending to turn the rotor wheel in the same direction as aforesaid.

The discharge of the gases at high velocity through each of the openings 65 and against the row of relatively narrow stator blading adjacent thereto and being to the left as shown in Figure 5, results in the expansion of said gas in said stator blading and the deflection therefrom of said gas impinges upon the working faces of the rotor blades.

The gases discharged from openings 64 and 65 are deflected into impingement with the working faces of the rotor blades 61 at different angles and at high velocities and exert substantial force rotatively upon the first or high-pressure rotor wheel. Thence said gases flow substantially axially through the succeeding row of stator blading, which is shown to the right of openings 64 and 65 in Figure 4. Said last named stator blades deflect said gases against the working forces of the succeeding row of stator blades 60.

The gases discharged at high velocity from openings 66 and at an angle to the axis of the turbine impinge against the stator blading at the right of said opening 66 in Figure 4. This stator blading deflects said last named gases against the working faces of the rotor blading to the right of opening 66 in the instance shown in Figure 4.

The discharge from said openings 64, 65 and 66 produces a reaction of substantial force, exerting a substantial turning effort upon the rotor to turn in the direction to the left from the upper part of Figure 5, in which same direction all of said forces of the expanding gas are directed.

The buckets 83 form the greatest area of the periphery of each rotor and tend to substantially lessen the heat radiation from the rotor blades to the casing. The combustion chamber being also at the center of the rotor tends to rapidly heat the rotor to high working temperature in starting. The interior of the casing 1 in starting is not likely to become so hot and is therefore liable to expand at a lesser degree than the rotors. This difference in expansion, with ordinary working clearance between the tips of the rotor blades and the tips of the supplemental stator blades 82 would, in other constructions, tend to cause, on the occurrence of sudden high temperature differences, the binding of the tips of said rotor and stator blades. The high velocity of the rotors with the outward cam-shaped forward portion of each rotor blade thereof normally causes a flow of gas over the tip of each rotor blade and against the curved inner surface of the buckets 83 similar to the action and deflection of the gases coming through opening 64 as heretofore explained, so that the gases passing over the tips of the rotor blades are thus caused to exert some substantial turning effort upon the working surfaces of the blades and the forces thereof acting thereon as the resultant of the forces of said last stated gas with that of the other gases.

The said force resulting from this passing of the gases over the tips of the rotor blades at an angle toward the right of Figure 4 is akin to the action of the very broad or blunt front edge of an aeroplane wing upon the air, producing a reaction increasing the buoyancy of the plane.

Furthermore, the cavities formed by the buckets 83 substantially decrease heat radiation from the hot rotor blades to the turbine casing and cause practically the whole of said radiation to be imparted to the gases moving in said cavities. Said cavities also substantially reduce the friction between the rotor blade tips and the casing. The turbine casing is made in sections and secured together as shown in Figure 6.

*The cooling medium and its circulation*

The cooling medium passes from the pump 20 through conduit 25 and branch conduit 26, see Figure 1, to a receptacle 27, see Figure 4, thence through passage 44 and ports 41, see Figure 4, to channel 57, see also Figure 11, through ports 58 in rotor drum into chambers 71 and 72 of a rotor blade, see also Figures 4, 13, thence through ports 55, passage 54 and ports 56 through the low pressure blades and therefrom through ports 60 into channel 59. The cooling medium then passes into chamber 84 in the rotor shaft section to discharge into receptacle 29 and by conduit 30 to the source of supply. The branch 28, see Figure 1, leads to the turbine casing and stator blading, into casing water jacket 85 of the lower half through passages 86 in the stator blades of the lower half to the passage 79 in the shrouding, thence through passages 87 through the stator blades in the upper half of the casing into water jacket 88 and thence through conduit 31 to the source of supply.

I provide means to effect the preliminary ignition on starting in the form of an electrically heated member 89 carried by a rod 90 having a grasping handle 91, so that the heating member when not in use can be drawn into the recess 92 in the nozzle 23 and thus not project into the combustion chamber 50 when not in use. The rotor shaft has preferably a scoop 93, see Figure 4, functioning as an impeller blade of a rotary pump supplementing the pump 20 so that the latter may be only of the force required to force the cooling medium through the cooling passages of the stationary casing 1, while said impeller 93 will exert upon the cooling medium sufficient force additional to that imparted to it by pump 20 to force the cooling medium at requisite velocity through the cooling medium passages in the rotor. The stator blading forms with juxtaposed parts fluid tight joints, both with the casing and with the shrouding. The rotor blading forms fluid tight joints with the drum. There is therefore no likelihood of leakage of the cooling medium into the combustion space.

The operation

The fuel and air are continuously fed to their respective passages in the nozzle 23 so that a continuous combustion is maintained in the combustion chamber 50. For starting the ignition member is moved into the chamber 50 and the current turned on. The circuit is then closed as soon as the engine is running normally and the member 89 withdrawn into its chamber 92. The fuel and air feeds are controlled by their manually actuated valves, see Figure 4 and the center of Figure 3.

The ignited gases in the combustion chamber 50 continuously pass through the ports 53 in the rotor drum 45 to and through the gas nozzles 63 into the expansion space of the turbine, impinging against the annular blading 82, reacting on the high pressure rotor blades, and stator blading. The gases then travel parallel with the rotor drum and coact in a similar manner with the blading of the low pressure stage. The exhaust takes place from the chamber 73, through conduit 74 and exhaust pump 33.

Special attention is directed to the novel method of and construction for effecting the cooling of the parts subjected to high temperature. The rotor drum is provided with annular passages or chambers which are unobstructed and surround the combustion chamber 50 so that a maximum amount of cooling medium can be employed. This cooling medium continuously circulates into and through the rotor blades, which are cored out to form large and unobstructed passages, with no chance for the cooling medium, if water is used, to leak or escape into the motive fluid expansion space and thus reduce the kinetic energy of the hot gases. The walls of the rotor drum can thus be made comparatively thin with a corresponding reduction in weight and still be maintained below destructive temperatures. The ribs 51 and 52 integral with the drum contribute to form a wall of the cooling passages and ports in the drum, and the rib 51 contains the gas ports to direct the ignited gases into the gas tubes of the high pressure rotor blades. The forward clamping head has ribs 94 forming a spider to support the rotor shaft section and also to receive the fastening devices. The clamping head 49 has bosses 95 to receive the fastening devices. The cooling medium serves to cool the portions of the rotor shaft in proximity to the rotor drum. In my present construction the weight per horse power has been materially reduced. Single tail arrows indicate the course of the cooling medium, double tail arrows indicate the course of the fuel and motive fluid. Any approved type of charge forming device may be used.

In the form of rotor drum seen in Figure 22 instead of using annular passages or channels as in the rotor drum 45 I have a series of longitudinally extending passages 98 having ports 99 leading to the high pressure rotor blades, the cooling medium returning through ports 100 to longitudinally extending passages 101, thence through ports 102 to the low pressure blades returning through ports 103 to the passages 104 and thence to the source of supply of the cooling medium as explained with the other figures of the drawings. The passages 98, 101 and 104 are in longitudinal alignment. The passages 101 compel the cooling medium after passing through a high pressure blade to be passed through only its corresponding low pressure blade. This accomplishes an exchange of the surplus heat of each high pressure blade to be exchanged to its fellow low pressure blade to lessen the radiation of the motive fluid to the low pressure blades and thereby obtain useful work from such radiation loss. Furthermore, the ribs forming the walls of passages 98, 101 and 104 also function as heat exchanging elements to radiate heat from the combustion chamber to said walls and to the exterior wall the casting forming said chamber so as to provide greater radiation from the surfaces thereof to the cooling medium in contact therewith.

It will be seen from Figure 19 that the turbine casing 1 has tapered openings 105 into which seat the tapered extensions 106 of the stator blades to ensure a fluid-tight seal. The stator blades at their inner ends have a dovetail connection with the shrouding to form a fluid-tight joint therewith.

It will now be apparent that I have devised a novel and useful combustion turbine method and apparatus which embodies the features of advantages enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

The invention herein described may be manufactured and used by and for the Government of the United States for governmental purposes without the payment to me of any royalty thereon or therefor.

Having thus described my invention, what I claim and desire to secure by Letters Patent is:

1. In a combustion turbine, a rotor drum having a combustion chamber centrally disposed within said drum with its axis coincident with the axis of revolution of the drum, the walls forming said chamber being separated from and connected by ribs to the drum to form annular passageways for a cooling medium to pass along the outer walls of the drum and chamber, the weight of said drum and chamber being equally disposed in all directions about said axis.

2. In a combustion turbine, a rotor drum having a combustion chamber centrally disposed within said drum with its axis coincident with the axis of revolution of the drum, the walls forming said chamber being separated from and connected by ribs to the drum to form annular passageways for a cooling medium to pass along the outer wall of the chamber, rotor blades supported by the drum, and passageways within the rotor blades cooperating with passageways in the wall of the drum for the circulation of a cooling medium through the outer walls of said drum and chamber and through the blades.

3. In a combustion turbine, a rotor drum having a combustion chamber centrally disposed within said drum with its axis coincident with the axis of revolution of the drum, rotor blades supported by the drum, stator blades, cooperative passageways extending through the rotor blades and the drum and into the combustion chamber for the flow of gases generated in the chamber to act upon the exterior surfaces of said rotor and stator blades, and separate passageways within the rotor blades for the circulation of a cooling medium therethrough.

4. In a combustion turbine, a rotor drum having a combustion chamber centrally disposed within said drum with its axis coincident with the axis of revolution of the drum, the chamber being separated from and connected by ribs to the drum to form annular passageways for a cooling medium to pass along between the walls of the drum and chamber, rotor blades supported by the drum, a passageway within each of the rotor blades for the circulation of a cooling medium, and radial longitudinal ribs in the chamber, annular passageways in the rotor blades to form continuous longitudinal passageways of a cooling medium through the walls of the drum, the rotor blades between said ribs and thence through the walls of the drum to a discharge point.

5. In a combustion turbine, an upper and a lower set of stator blades having passages through them, a sectional shrouding having interlocking sections forming fluid-tight joints, a sectional casing, means for securing said sectional shrouding to their respective sections of said casing and for removably securing said casing sections together, and means to circulate a cooling medium through one set of stator blades directly into the shrouding and therefrom through the other set of stator blades.

6. In a combustion turbine, a sectional casing, each section of which has a chamber for a cooling medium, and having tapered openings from the inner surface extending into said chamber, apertured stator blades having tapered extensions to fit said openings, a shrouding interlocked with said stator blades and having a passage communicating with the stator blades, means for removably securing said blades to said casing, and means to circulate a cooling medium through said casing, chambers, stator blades and shrouding.

CHARLES N. KOCH.